(12) United States Patent
Dewan

(10) Patent No.: US 11,343,070 B2
(45) Date of Patent: May 24, 2022

(54) SYSTEM AND METHOD FOR PERFORMING A FULLY HOMOMORPHIC ENCRYPTION ON A PLAIN TEXT

(71) Applicant: Hrishikesh Dewan, Bangalore (IN)

(72) Inventor: Hrishikesh Dewan, Bangalore (IN)

(73) Assignee: Hrishikesh Dewan

(*) Notice: Subject to any disclaimer, the term of this patent is extended or adjusted under 35 U.S.C. 154(b) by 0 days.

(21) Appl. No.: 17/057,711

(22) PCT Filed: May 18, 2019

(86) PCT No.: PCT/IB2019/054116
§ 371 (c)(1),
(2) Date: Nov. 23, 2020

(87) PCT Pub. No.: WO2019/224676
PCT Pub. Date: Nov. 28, 2019

(65) Prior Publication Data
US 2021/0297233 A1    Sep. 23, 2021

(30) Foreign Application Priority Data

May 23, 2018  (IN) .............................. 201741042107

(51) Int. Cl.
*H04L 29/06*    (2006.01)
*H04L 9/00*    (2022.01)
*H04L 9/30*    (2006.01)

(52) U.S. Cl.
CPC .............. *H04L 9/008* (2013.01); *H04L 9/302* (2013.01); *H04L 9/3013* (2013.01)

(58) Field of Classification Search
CPC ........ H04L 9/008; H04L 9/3013; H04L 9/302
See application file for complete search history.

(56) References Cited

U.S. PATENT DOCUMENTS 8,515,058 B1 *  8/2013  Gentry .................... H04L 9/008
                                                        380/28
9,942,031 B2 *  4/2018  Kahrobaei ............. H04L 9/008
(Continued)

FOREIGN PATENT DOCUMENTS

CN            108965258 A        12/2018

OTHER PUBLICATIONS

Poulakis, "A public key encryption scheme based on factoring and discrete logarithm", Journal of Discrete Mathematical Sciences & Cryptography, vol. 12 (2009), No. 6, pp. 745-752 (Year: 2009).*

(Continued)

*Primary Examiner* — Morshed Mehedi
(74) *Attorney, Agent, or Firm* — Jason C. Cameron

(57) ABSTRACT

A method for performing a fully homomorphic encryption on a plain text is disclosed. The method includes computing a first subfunction based on a first computationally intractable problem and the plain text to generate a first section of a cipher text. The method also includes computing a second subfunction based on a second computationally intractable problem and the plain text to generate a second section of the cipher text. The method further includes generating a fully homomorphic function by integrating the first subfunction and the second subfunction. The method further includes encrypting the plain text to a fully homomorphic cipher text using the fully homomorphic function.

16 Claims, 3 Drawing Sheets

(56) References Cited

U.S. PATENT DOCUMENTS

| | | | |
|---|---|---|---|
| 9,946,810 B1* | 4/2018 | Trepetin | H04L 9/008 |
| 10,171,230 B2* | 1/2019 | Yagisawa | H04L 9/14 |
| 10,541,805 B2* | 1/2020 | Laine | H04L 9/008 |
| 2015/0295925 A1* | 10/2015 | Patey | G06K 9/0061 |
| | | | 713/186 |
| 2019/0007196 A1* | 1/2019 | Malluhi | H04L 9/008 |
| 2019/0036678 A1* | 1/2019 | Ahmed | H04L 9/302 |
| 2019/0386814 A1* | 12/2019 | Ahmed | H04L 9/3013 |

OTHER PUBLICATIONS

Cardoso et al., "Deformations of special geometry: in search of the topological string", Journal of High Energy Physics vol. 2014, Article No. 96 (Year: 2014).*

Nitin Jain, Saibal K. Pal & Dhananjay K. Upadhyay; Implementation and Analysis of Homomorphic Encryption Schemes; International Journal on Cryptography and Information Security(IJCIS),vol. 2, No. 2, Jun. 2012.

* cited by examiner

SYSTEM AND METHOD FOR PERFORMING A FULLY HOMOMORPHIC ENCRYPTION ON A PLAIN TEXT

CROSS-REFERENCE TO RELATED APPLICATION

This National Phase application claims priority from a provisional patent application filed in India having Patent Application No. 201741042107 filed on 23$^{rd}$ day of May 2018 and titled "SECURE AND ANONYMOUS STORAGE, ACCESS AND PROCESSING OF FILES AND RECORDS IN A FILE/DATABASE STORAGE SYSTEM" And PCT Application No. PCT/IB2019/054116 filed on May 18, 2019, titled "SYSTEM AND METHOD FOR PERFORMING A FULLY HOMOMORPHIC ENCRYPTION ON A PLAIN TEXT"

BACKGROUND

Embodiments of a present disclosure relates to encryption and more particularly to a system and a method for performing a fully homomorphic encryption on a plain text.

The demand for privacy of digital data for handling more and more complex structures has increased dramatically over the last decade. Such demand goes hand in hand with the growth in communication capacity and its diverse applications. For securely storing and accessing both data and networks current technology offers several alternatives, such as encrypting data or data communication pathways. However, the encrypted data needs to be decrypted, processed as needed, and then re-encrypted, thereby exposing the encrypted data to potential misappropriation and theft.

Furthermore, with advancement in technology, homomorphic encryption techniques have been introduced for encryption of data. The homomorphic encryption technique enables performing arithmetic operations on encrypted data without knowledge of any secret decryption key. However, such schemes, which may generally evaluate low-depth circuits, remain inefficient due to required bootstrapping.

Moreover, during the last few years, homomorphic encryption techniques have been studied extensively Such a scheme enables the construction of programs for any desirable functionality, which may be run on encrypted inputs to produce an encryption of the result and such a program need never decrypt its inputs.

Hence, there is a need for an improved system and method for performing a fully homomorphic encryption on a plain text to address the aforementioned issue(s).

BRIEF DESCRIPTION

In accordance with an embodiment of the present disclosure, a method for performing a fully homomorphic encryption on a plain text is provided. The method includes computing a first subfunction based on a first computationally intractable problem and the plain text to generate a first section of a cipher text. The method also includes computing a second subfunction based on a second computationally intractable problem and the plain text to generate a second section of the cipher text. The method further includes generating a fully homomorphic function by integrating the first subfunction and the second subfunction. The method further includes encrypting the plain text to a fully homomorphic cipher text using the fully homomorphic function.

In accordance with another embodiment of the present disclosure, a system for performing a fully homomorphic encryption on a plain text is provided. The system includes a cipher text computation subsystem configured to compute a first subfunction based on the first computationally intractable problem and the plain text to generate a first section of a cipher text. The cipher text computation subsystem is also configured to compute a second subfunction based on the second computationally intractable problem and the plain text to generate a second section of the cipher text. The system also includes a fully homomorphic function generation subsystem operatively coupled to the cipher text computation subsystem. The fully homomorphic function generation subsystem is configured to generate a fully homomorphic function by integrating the first subfunction and the second subfunction. The system further includes an encryption subsystem operatively coupled to the fully homomorphic function generation subsystem. The encryption subsystem is configured to encrypt the plain text to a fully homomorphic cipher text using the fully homomorphic function.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
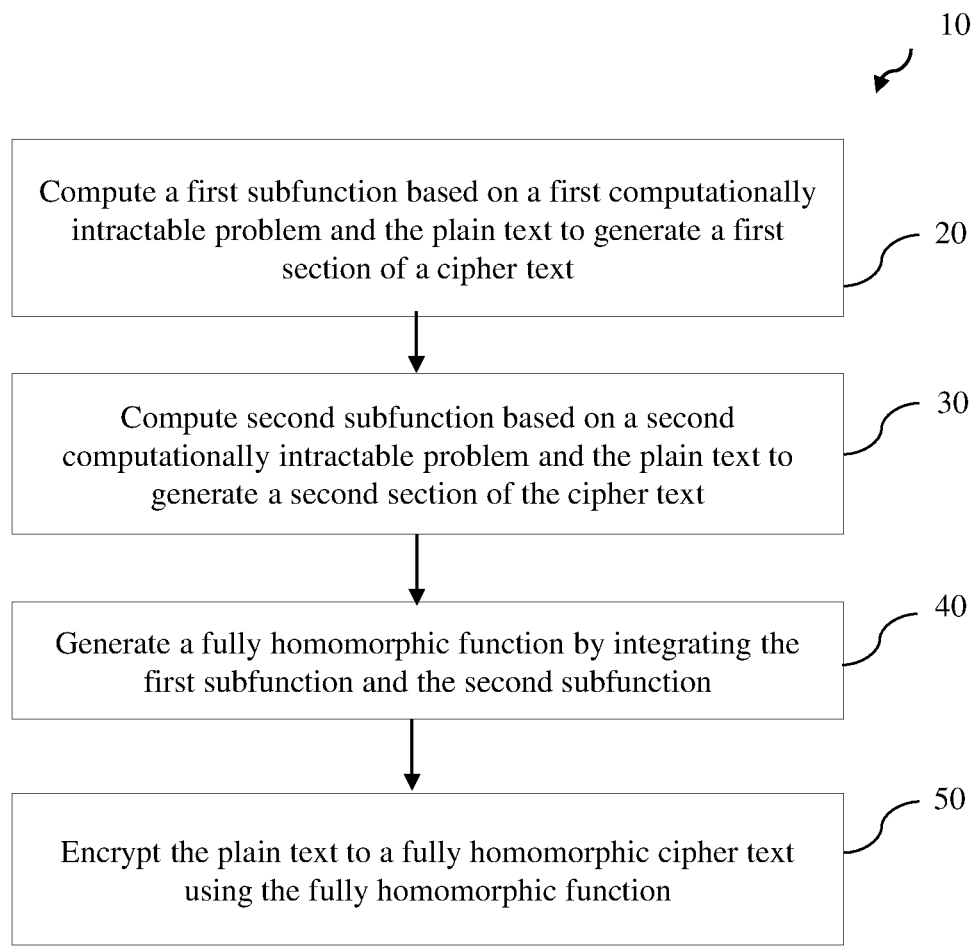
FIG. 1 is a flow chart representing the steps involved in a method for performing a fully homomorphic encryption on a plain text in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of a present disclosure relate to a system and a method for performing a fully homomorphic encryption on a plain text is provided. The method includes computing a first subfunction based on a first computationally intractable problem and the plain text to generate a first section of a cipher text. The method also includes computing a second subfunction based on a second computationally intractable problem and the plain text to generate a second section of the cipher text. The method further includes generating a fully homomorphic function by integrating the first subfunction and the second subfunction. The method further includes encrypting the plain text to a fully homomorphic cipher text using the fully homomorphic function.

FIG. 1 is a flow chart representing the steps involved in a method 10 for performing a fully homomorphic encryption on a plain text in accordance with an embodiment of the present disclosure. The method 10 includes computing a first subfunction based on a first computationally intractable problem and the plain text to generate a first section of a cipher text in step 20. As used herein, the terms "plain text" and "cipher text" are defined as cipher text is a result of encryption performed on plaintext using an algorithm called a cipher. Plain text is a combination of characters before encryption. Similarly, the term "computationally intractable problem" is defined as a problem which may be solved in theory but for which in practice any solution takes too many computational resources to be useful. In one embodiment, computing the first subfunction may include computing the first subfunction based on the first computationally intractable problem capable of operating on one or more group algebraic structures. As used herein "group algebraic structure" is defined as a set with a binary operation that is associative, contains an identity element and inverse elements for that operation. In another embodiment, computing the first subfunction may include computing the first subfunction based on the first computationally intractable problem capable of operating on one or more ring algebraic structures. As used herein, "ring algebraic structure" is defined as a set with two binary operations of addition and multiplication. Both operations are associative and contain identity elements.

In some embodiments, computing the first subfunction based on the first computationally intractable problem may include computing the first subfunction based on a prime factorization problem. The prime factorization problem is a mathematical problem in which every number may be reached by multiplying some prime numbers together. In such embodiment, computing the first subfunction based on the prime factorization problem may include computing the first subfunction based on a first prime number and a second prime number. Here, a size of each of the first prime number and the second prime number is at least of 2048 bits. In such embodiment, computing the first subfunction based on the prime factorization problem may include computing the first subfunction based on multiplication of the first prime number with the second prime number to generate a modulus n function.

In one embodiment, computing the first subfunction may include a Euler's totient function based on the modulus n function. The Euler's totient function counts the positive integers up to a given integer that are relatively prime to the given integer. The Euler's totient function is a multiplicative function gives the order of the multiplicative group of integers modulo n. In another embodiment, computing the first subfunction may include computing the first subfunction by using the first prime number based on the modulus n function. In yet another embodiment, computing the first subfunction may include computing the second subfunction by using the first prime number based on the modulus n function. In one embodiment, generating the first section of the cipher text may include generating the first section of the cipher text by multiplying the first subfunction with the first prime number.

The method 10 also includes computing a second subfunction based on a second computationally intractable problem and the plain text to generate a second section of the cipher text in step 30. In one embodiment, computing the second subfunction may include computing the second subfunction based on the second computationally intractable problem capable of operating on one or more group algebraic structures. In another embodiment, computing the second subfunction may include computing the second subfunction based on the second computationally intractable problem capable of operating on one or more ring algebraic structures In some embodiments, computing the second subfunction based on the second computationally intractable problem may include computing the second subfunction based on a discrete logarithmic problem. As used herein, the discrete logarithmic problem includes logarithms defined with regard to multiplicative cyclic groups. In such embodiment, computing the second subfunction based on a discrete logarithmic problem may include computing the second subfunction based on a generator function selected from a cyclic group algebraic structure of one or more group algebraic structures. In one embodiment, generating the second section of the cipher text may include generating the second section of the cipher text by multiplying the second subfunction with the first prime number.

The cyclic group is a group which is generated by a single element. Every cyclic group is an abelian group (group operation is commutative), and every finitely generated abelian group is a direct product of cyclic groups. If G is a multiplicative cyclic group and g is a generator of G, then from the definition of cyclic groups, we know every element h in G may be written as $g^x$ for a function x. The prime factorization problem and the discrete logarithmic problem are partial homomorphic functions.

The method 10 further includes generating a fully homomorphic function by integrating the first subfunction and the second subfunction in step 40. The fully homomorphic function enables the construction of programs for any desirable functionality, which may be run on encrypted inputs to produce an encryption of the result. The method 10 further includes encrypting the plain text to a fully homomorphic cipher text using the fully homomorphic function in step 50. In one embodiment, the method 10 may include performing an arithmetic operation on the fully homomorphic cipher text to generate a resultant fully homomorphic cipher text. In another embodiment, performing a Boolean operation on the fully homomorphic cipher text to generate a resultant fully homomorphic cipher text.

In one embodiment, the fully homomorphic function includes a set of integers as trapdoors. The set of trapdoors are then further optimized to be used as a public-private key pair constituting an asymmetric fully homomorphic encryption function. The public-private key pair generation may be derived from the one or more group algebraic structures. The public key may be used to encrypt or encode the plain text and private key may be used to decrypt or decode the plain text. The system may also be used as a symmetric encryption system where Diffie Hellman or such other key exchange algorithms are used to securely share the key among at least two parties. In some embodiments, the fully homomorphic function supports both addition and multiplication, and using other functions may also be used to support subtraction and division. Furthermore, the homomorphic properties of the functions are retained when addition, multiplication, and divisions are performed by unencrypted text on encrypted text. Since the functions support both addition and subtraction therefore encoded or encrypted messages may be ordered without knowing the underlying plain text. The fully homomorphic function may be used to encode unencrypted data one bit at a time; a block of bytes constituting an integer or a series of a block of bytes constituting a set of integers. As a consequence of applying fully homomorphic function on a set of integer data, such fully homomorphic encryption technique may be used to encode string data type, integer data types and floating points data types using Fixed-Point Arithmetic. The fixed point arithmetic on integers is then used to compute floating point numbers.

Figure 2:
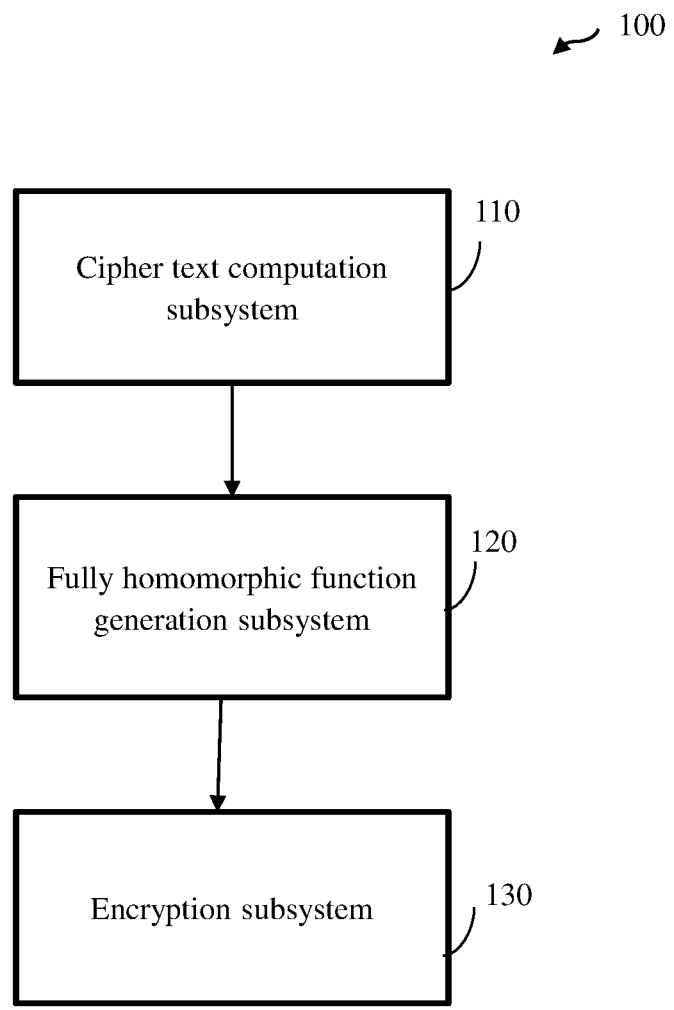
FIG. 2 is a block diagram representation of a system for performing a fully homomorphic encryption on a plain text in accordance with an embodiment of the present disclosure.

FIG. 2 is a block diagram representation of a system 100 for performing a fully homomorphic encryption on a plain text in accordance with an embodiment of the present disclosure. The system 100 includes a cipher text computation subsystem 110 configured to compute a first subfunction based on the first computationally intractable problem and the plain text to generate a first section of a cipher text. In one embodiment, the first computationally intractable problem may be capable of operating on one or more group algebraic structures. In another embodiment, the first computationally intractable problem may be capable of operating on one or more ring algebraic structures. In some embodiment, the first computationally intractable problem may include a prime factorization problem. In such embodiment, the prime factorization problem may include computation of the first subfunction based on a first prime number and a second prime number. The size of each of the first prime number and the second prime number is at least of 2048 bits.

In a specific embodiment, the cipher text computation subsystem 110 may be configured to compute the first subfunction based on multiplication of the first prime number with the second prime number to generate a modulus n function. In such embodiment, the cipher text computation subsystem 110 may be configured to compute a Euler's totient function based on the modulus n function. In one embodiment, the cipher text computation subsystem 110 is configured to generate the first section of the cipher text by multiplying the first subfunction with the first prime number.

Furthermore, the cipher text computation subsystem 110 is also configured to compute a second subfunction based on the second computationally intractable problem and the plain text to generate a second section of the cipher text. In one embodiment, the second computationally intractable problem may be capable of operating on one or more group algebraic structures. In another embodiment, the second computationally intractable problem may be capable of operating on one or more ring algebraic structures. In some embodiments, the second computationally intractable problem may include a discrete logarithmic problem. In such embodiment, the cipher text computation subsystem 110 may be configured to compute the second subfunction based on a generator function selected from a cyclic group algebraic structure of one or more group algebraic structures. In one embodiment, the cipher text computation subsystem 110 is configured to generate the second section of the cipher text by multiplying the second subfunction with the first prime number. Further, each subfunction may include components combined with any mathematical operations such as multiplication or even functions such as exponential, include random variables to introduce noise in the system. Moreover, the first subfunction and the second subfunction includes three components, each subfunction may include one, two or more than three components.

Moreover, the system 100 includes a fully homomorphic function generation subsystem 120 operatively coupled to the cipher text computation subsystem 110. The fully homomorphic function generation subsystem 120 is configured to generate a fully homomorphic function by integrating the first subfunction and the second subfunction. The system 100 further includes an encryption subsystem 130 operatively coupled to the fully homomorphic function generation subsystem 120, wherein the encryption subsystem 130 is configured to encrypt the plain text to a fully homomorphic cipher text using the fully homomorphic function.

In one embodiment, the encryption subsystem 130 may be configured to perform an arithmetic operation on the fully homomorphic cipher text to generate a resultant fully homomorphic cipher text. In another embodiment, the encryption subsystem 130 may be configured to perform a Boolean operation on the fully homomorphic cipher text to generate a resultant fully homomorphic cipher text.

Figure 3:
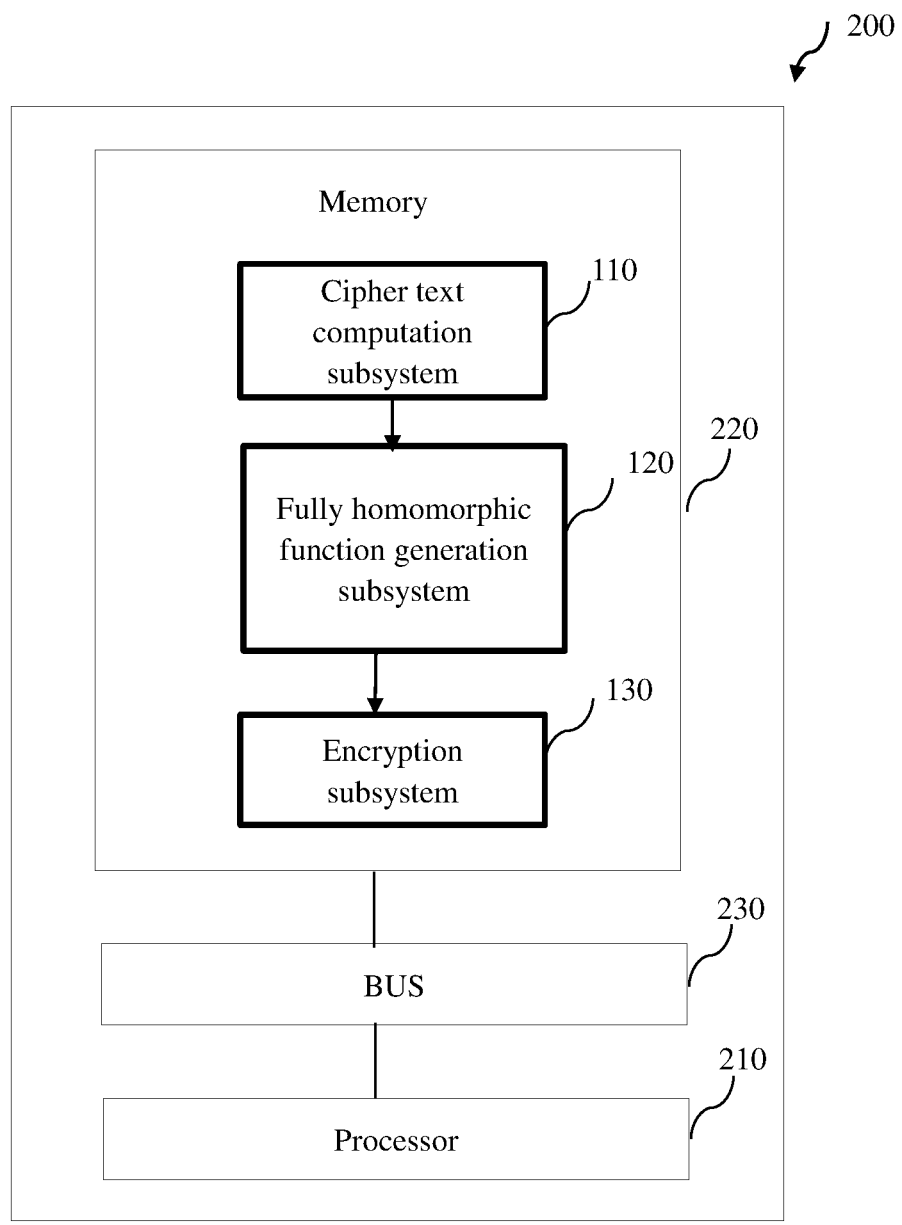
FIG. 3 is a block diagram of a computer or a server in accordance with an embodiment of the present disclosure.

FIG. 3 is a block diagram of a computer or a server in accordance with an embodiment of the present disclosure. The server 200 includes processor(s) 210, and memory 220 coupled to the bus 230. As used herein, the processor 210 and memory 220 are substantially similar to the cipher text computation subsystem 110, the fully homomorphic function generation subsystem 120 and the encryption subsystem 130 of FIG. 2.

The processor(s) 210, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 220 includes a plurality of modules stored in the form of executable program which instructs the processor 210 to perform the method steps illustrated in FIG. 1.

The memory 220 has following modules: the cipher text computation subsystem 110, the fully homomorphic function generation subsystem 120 and the encryption subsystem 130. The cipher text computation subsystem 110 configured to compute a first subfunction based on the first computationally intractable problem and the plain text to generate a first section of a cipher text. The cipher text computation subsystem 110 is also configured to compute a second subfunction based on the second computationally intractable problem and the plain text to generate a second section of the cipher text.

The memory 220 also includes a fully homomorphic function generation subsystem 120 operatively coupled to the cipher text computation subsystem 110. The fully homomorphic function generation subsystem 120 is configured to generate a fully homomorphic function by integrating the first subfunction and the second subfunction. The memory 220 further includes an encryption subsystem 130 operatively coupled to the fully homomorphic function generation subsystem 120. The encryption subsystem 130 is configured to encrypt the plain text to a fully homomorphic cipher text using the fully homomorphic function. In one embodiment, the encryption subsystem 130 may be configured to perform an arithmetic operation on the fully homomorphic cipher text to generate a resultant fully homomorphic cipher text. In another embodiment, the encryption subsystem 130 may be configured to perform a Boolean operation on the fully homomorphic cipher text to generate a resultant fully homomorphic cipher text.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 210.

Various embodiments of the system and method for performing a fully homomorphic encryption on a plain text described above enables highly secure encryption as one no one can read or modify encrypted data without the encryption key. The system provides the processing on encrypted data.

The applications of the fully homomorphic encryption are manifold. The fully homomorphic encryption may be used to encrypt databases and perform SQL or no SQL queries in completely encrypted form, perform a search on top of encrypted text and even be used for performing artificial intelligence or machine learning algorithms.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A method for performing a fully homomorphic encryption on a plain text comprising:
   computing, by a cipher text computation subsystem, a first subfunction based on a first computationally intractable problem and the plain text to generate a first section of a cipher text;
   computing, by the cipher text computation subsystem, a second subfunction based on a second computationally intractable problem and the plain text to generate a second section of the cipher text;
   generating, by a fully homomorphic function generation subsystem, a fully homomorphic function by integrating the first subfunction and the second subfunction; and
   encrypting, by an encryption subsystem, the plain text to a fully homomorphic cipher text using the fully homomorphic function.

2. The method as claimed in claim 1, wherein computing the first subfunction comprises computing the first subfunction based on the first computationally intractable problem capable of operating on one or more group algebraic structures.

3. The method as claimed in claim 1, wherein computing the first subfunction based on the first computationally intractable problem comprises computing the first subfunction based on a prime factorization problem.

4. The method as claimed in claim 3, wherein computing the first subfunction based on the prime factorization problem comprises computing the first subfunction based on a first prime number and a second prime number, wherein a size of each of the first prime number and the second prime number is at least of 2048 bits.

5. The method as claimed in claim 4, wherein computing the first subfunction based on the prime factorization problem comprises computing the first subfunction based on multiplication of the first prime number with the second prime number to generate a modulus n function.

6. The method as claimed in claim 5, wherein computing the first subfunction comprises computing a Euler's totient function based on the modulus n function.

7. The method as claimed in claim 1, wherein computing the second subfunction comprises computing the second subfunction based on the second computationally intractable problem capable of operating on one or more group algebraic structures.

8. The method as claimed in claim 1, wherein computing the second subfunction based on the second computationally intractable problem comprises computing the second subfunction based on a discrete logarithmic problem.

9. The method as claimed in claim 8, wherein computing the second subfunction based on the discrete logarithmic problem comprises computing the second subfunction based on a generator function selected from a cyclic group algebraic structure of one or more group algebraic structures.

10. The method as claimed in claim 1, further comprising performing, by the encryption subsystem, an arithmetic operation on the fully homomorphic cipher text to generate a resultant fully homomorphic cipher text.

11. The method as claimed in claim 1, further comprising performing, by the encryption subsystem, a Boolean operation on the fully homomorphic cipher text to generate a resultant fully homomorphic cipher text.

12. A system for performing a fully homomorphic encryption on a plain text comprising:
   a processor; and
   a memory storing executable instructions, operably coupled to the processor comprising:
   a cipher text computation subsystem configured to:
      compute a first subfunction based on the first computationally intractable problem and the plain text to generate a first section of a cipher text;
      compute a second subfunction based on the second computationally intractable problem and the plain text to generate a second section of the cipher text;
   a fully homomorphic function generation subsystem operatively coupled to the cipher text computation subsystem, wherein the fully homomorphic function generation subsystem is configured to generate a fully homomorphic function by integrating the first subfunction and the second subfunction; and
   an encryption subsystem operatively coupled to the fully homomorphic function generation subsystem, wherein the encryption subsystem is configured to encrypt the plain text to a fully homomorphic cipher text using the fully homomorphic function.

13. The system as claimed in claim 12, wherein the first computationally intractable problem comprises a prime factorization problem.

14. The system as claimed in claim 12, wherein the second computationally intractable problem comprises a discrete logarithmic problem.

15. The system as claimed in claim 12, wherein the encryption subsystem is configured to perform an arithmetic operation on the fully homomorphic cipher text to generate a resultant fully homomorphic cipher text.

16. The system as claimed in claim 12, wherein the encryption subsystem is configured to perform a Boolean operation on the fully homomorphic cipher text to generate a resultant fully homomorphic cipher text.

* * * * *